(No Model.)

H. C. MAGNUSSON.
ARTIFICIAL HEAD FOR DENTIST'S USE.

No. 451,061. Patented Apr. 28, 1891.

Witnesses
H. L. Brown.
Robert Wade

Inventor
Howard C. Magnusson
By his Attorney
Oscar Snell

UNITED STATES PATENT OFFICE.

HOWARD C. MAGNUSSON, OF CHICAGO, ILLINOIS.

ARTIFICIAL HEAD FOR DENTISTS' USE.

SPECIFICATION forming part of Letters Patent No. 451,061, dated April 28, 1891.

Application filed December 22, 1890. Serial No. 375,525. (No model.)

*To all whom it may concern:*

Be it known that I, HOWARD C. MAGNUSSON, a citizen of the United States, residing at Chicago, in the county of Cook and State of Illinois, have invented an Artificial Head for Dentists for Clinical and Operating Purposes for the Use of Students in the Science of Dentistry, of which the following is a specification.

My invention relates to artificial means for illustrating the position of human teeth as in nature; and my objects are to provide means by which old teeth can be set into a form in their regular order and held in place in such a manner that they can easily be removed when necessary, and to make the forms for the teeth of both the upper and lower jaw not only removable, but interchangeable, so that any form will fit either jaw.

Another object is to attach the artificial head to any dentist's operating-chair, so that it can be quickly adjusted to any position which would be required in operating upon a living subject, and finally to hang the lower jaw to hinges which, when necessary, will permit the jaw to move, but at the same time will be so arranged that the jaw can be firmly locked, if necessary, in any position desired. These objects are attained by the means illustrated in the accompanying drawings, in which—

Figure 1:
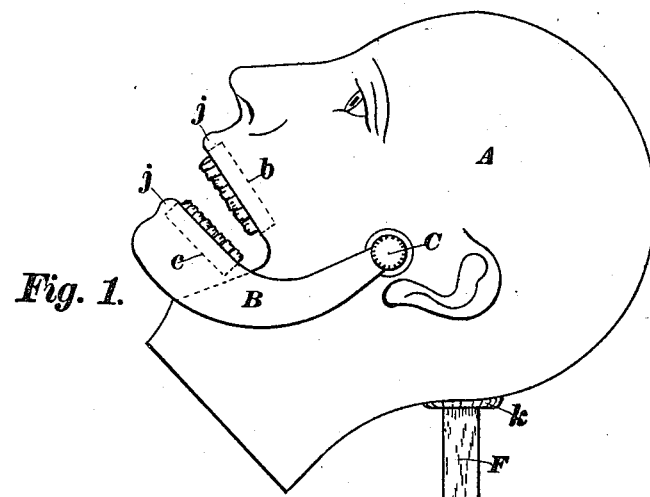
Figure 2:
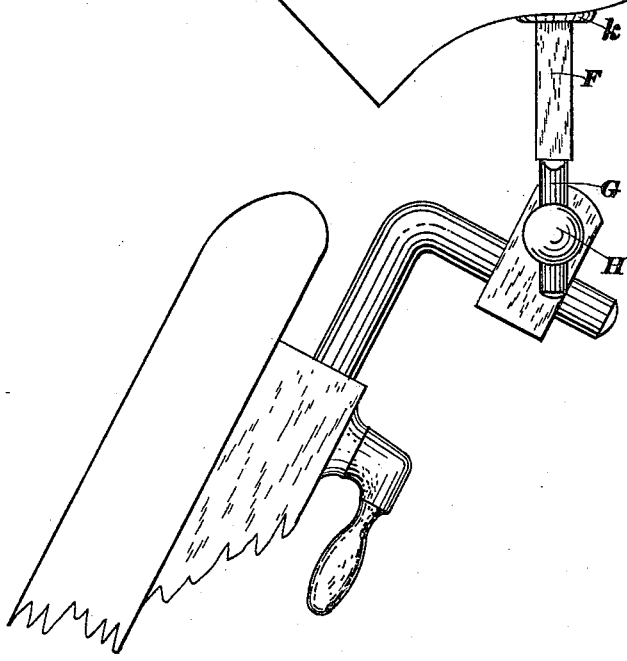
Figure 2:
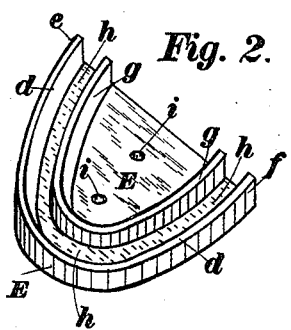

Figure 1 is a side view of the head, together with a part of the back of an ordinary dental operator's chair, showing method of attachment. Fig. 2 is a perspective view of one of the forms which are inserted into the jaws and which hold the teeth to be operated upon.

Similar letters refer to like parts in the several views.

The head A is usually made of either papier-maché or wood and of a size about equal to that of an average human head. The lower jaw B is usually made of metal, and at the hinge-point C on both sides of the head is provided with milled thumb-screws, which are attached to the hinge-bolt, so that the jaw can be firmly secured in a closed or any required open position. At the place occupied by the teeth the jaws are both cut out, as shown by the dotted lines at *b* and *c*.

The form E for holding the teeth is shown in Fig. 2, and consists of a plate E, around the margin of which is a ridge *d*, which extends from the rear *e* around to the rear at *f*, and inside of the ridge *d*, and removed from it a short distance is another ridge *g*, which leaves a space *h* between *d* and *g*. This space *h* holds the teeth, which are set around in their natural order and held firmly in position by means of cement or rubber, so that they can easily be removed after they have been operated upon. The form or plate E can be attached by means of screws passing through holes *i* or by any other convenient method. These forms are of a size and shape to snugly fit down into the cut-out places, dotted lines, Fig. 1, *b c*, and the forms, being alike in all their dimensions, can be placed in either the upper or lower jaw and secured in position. The cut-out places *b c* are deep enough to hold the forms E, so that only the top portion of the teeth appear beyond the lips *j* of the upper and lower jaws. There are several forms E provided for each head, so that while one set is being operated upon in the jaws others can be filled with teeth and ready to illustrate whatever is desired.

The head is held in position above the back of the operator's chair by means of a socket F, which is attached to the back part of the head at *k* by any suitable means. The socket F is a hollow tube square in cross-section, and there is a rod G with a square top end fitted to the inside of socket F and inserted therein as shown. The lower end of rod G is round, and is held by means of the usual clamp H. By this method of securing the head A to an operating-chair any position can be given to imitate that of a patient being operated upon.

It is obvious that this invention is an invaluable aid to both professors and students in dental colleges, since in all institutions of this kind there is always a scarcity of patients with their teeth in all the conditions of disease found in a large practice; but with a number of forms ready, old teeth in almost any condition of disease can be inserted in position and a great variety of difficult operations fully illustrated to a class without interruption.

I claim as my invention—

1. In an artificial head for the use of dentists for clinical and operating purposes, the described cut-out portions b and c in the upper and lower jaws, in combination with the described forms for holding human teeth, said forms being fitted to be attached within said cut-out portions and to be both removable and interchangeable, for the purposes described.

2. In an artificial head for the use of dentists for clinical and operating purposes, the described square socket F, said socket being secured at its top to the back portion of the head A, in combination with a rod G, having its top end squared and fitted into the interior of socket F, said rod having its lower end cylindrical to fit the clamp of an ordinary dental chair for the purpose of firmly holding and adjusting head A to any desired position, all as and for the purposes described.

HOWARD C. MAGNUSSON.

Witnesses:
H. L. BROWN,
OSCAR SNELL.